(12) United States Patent
Baba

(10) Patent No.: US 11,407,390 B2
(45) Date of Patent: Aug. 9, 2022

(54) VEHICLE CONTROL APPARATUS AND VEHICLE CONTROL METHOD

(71) Applicant: DENSO CORPORATION, Kariya (JP)

(72) Inventor: Takahiro Baba, Kariya (JP)

(73) Assignee: DENSO CORPORATION, Kariya (JP)

( * ) Notice: Subject to any disclaimer, the term of this patent is extended or adjusted under 35 U.S.C. 154(b) by 392 days.

(21) Appl. No.: 16/343,663

(22) PCT Filed: Oct. 12, 2017

(86) PCT No.: PCT/JP2017/037064
§ 371 (c)(1),
(2) Date: Apr. 19, 2019

(87) PCT Pub. No.: WO2018/074330
PCT Pub. Date: Apr. 26, 2018

(65) Prior Publication Data
US 2020/0055494 A1    Feb. 20, 2020

(30) Foreign Application Priority Data
Oct. 19, 2016    (JP) .............................. JP2016-205051

(51) Int. Cl.
*B60T 7/22* (2006.01)
*G06T 7/70* (2017.01)
(Continued)

(52) U.S. Cl.
CPC ................ *B60T 7/22* (2013.01); *B60Q 5/006* (2013.01); *B60T 8/171* (2013.01); *B60T 8/172* (2013.01);
(Continued)

(58) Field of Classification Search
None
See application file for complete search history.

(56) References Cited

U.S. PATENT DOCUMENTS 8,125,372 B2 *   2/2012  Focke ..................... G01S 11/12
                                                   342/70
9,230,442 B2 *   1/2016  Bowers .................. G08G 1/161
(Continued)

FOREIGN PATENT DOCUMENTS

JP    2006178669 A  *  7/2006
JP    2010039617 A  *  2/2010
(Continued)

*Primary Examiner* — Maceeh Anwari
*Assistant Examiner* — Aarron E Santos
(74) *Attorney, Agent, or Firm* — Maschoff Brennan

(57) ABSTRACT

Control determines whether or not two objects represent the same object, in which one object is detected at a first position in front of a vehicle by an electromagnetic wave sensor and the other object is detected at a second position in front of the vehicle by image sensor. The control further determines whether or not the other object is partially excluded from an image acquired by the image sensor, in which a part of the object may have been outside the imaging region of the image sensor. The control changes a determination condition used for determining whether or not the objects represent the same object, such that the object whose part is excluded from the acquired image is more easily determined as the same object, compared with an object determined that such a part is not excluded from the acquired image.

17 Claims, 11 Drawing Sheets

(51) Int. Cl.
  *B60Q 5/00*      (2006.01)
  *B60T 8/171*     (2006.01)
  *B60T 8/172*     (2006.01)
  *G06V 20/58*     (2022.01)

(52) U.S. Cl.
  CPC .............. *G06T 7/70* (2017.01); *G06V 20/58* (2022.01); *G06T 2207/30261* (2013.01)

(56) References Cited

U.S. PATENT DOCUMENTS

2005/0004761 A1\* 1/2005 Takahama ............... G01S 17/86
                                              701/301
2014/0139369 A1  5/2014 Baba
2014/0343750 A1\* 11/2014 Minemura ............ B60W 50/04
                                              701/1
2017/0309180 A1  10/2017 Baba

FOREIGN PATENT DOCUMENTS

| JP | 2010-237872 A | 10/2010 |
| JP | 2014-222462 A | 11/2014 |
| JP | 2015-206797 A | 11/2015 |
| JP | 2016-066182 A |  4/2016 |

\* cited by examiner

FIG. 2
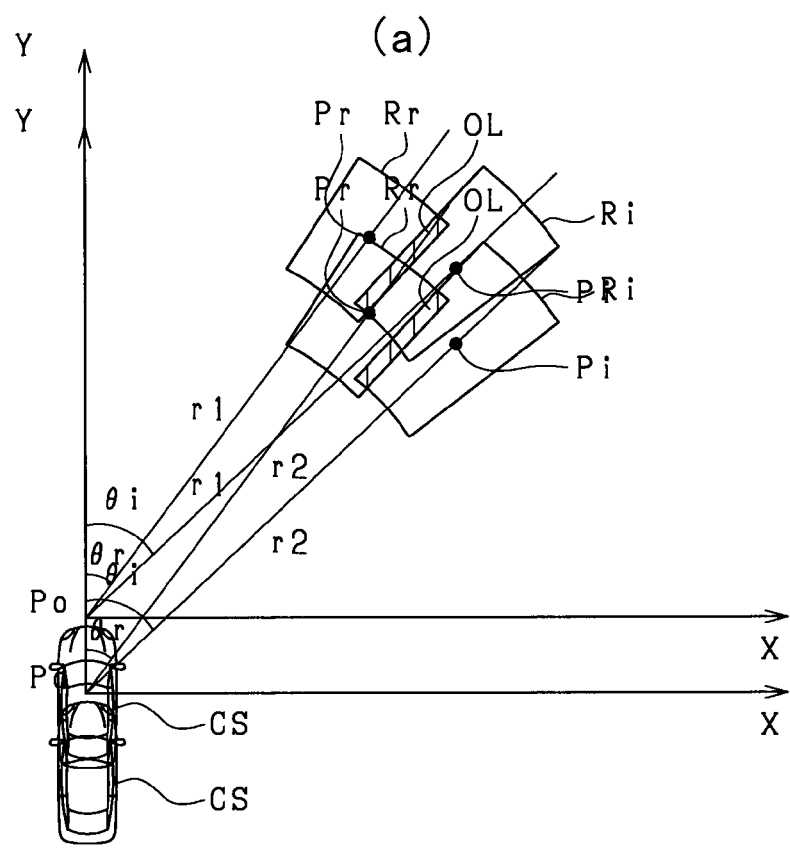
(a)
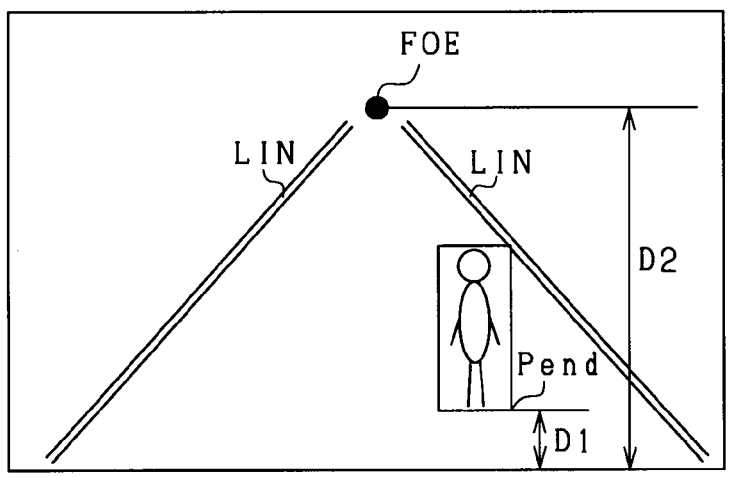
(b)

FIG.3
(a)
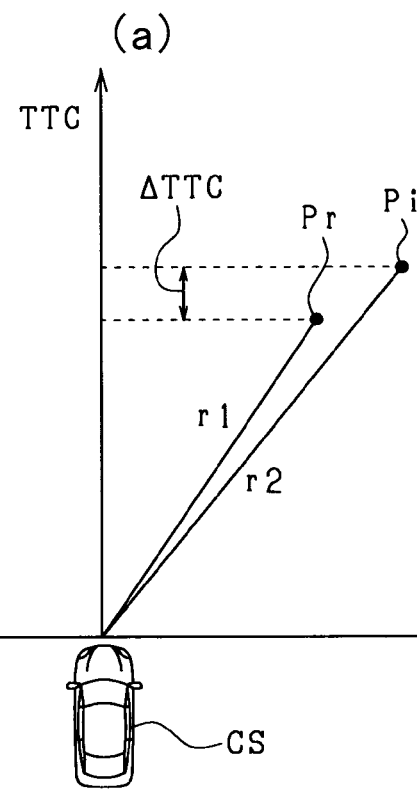
(b)
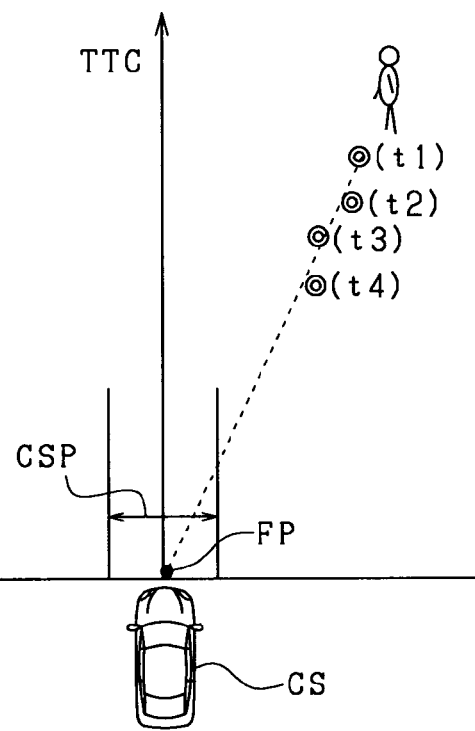

FIG.4
(a)
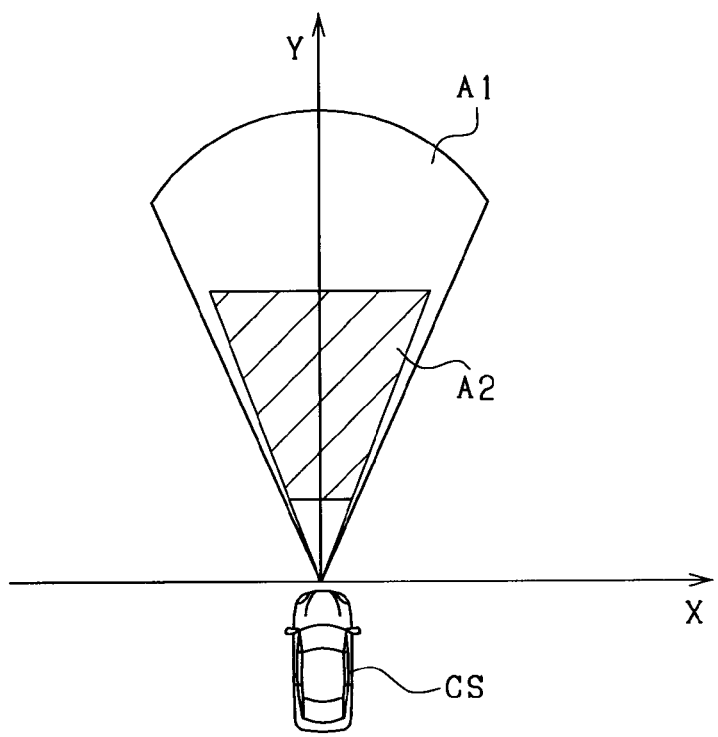
(b)
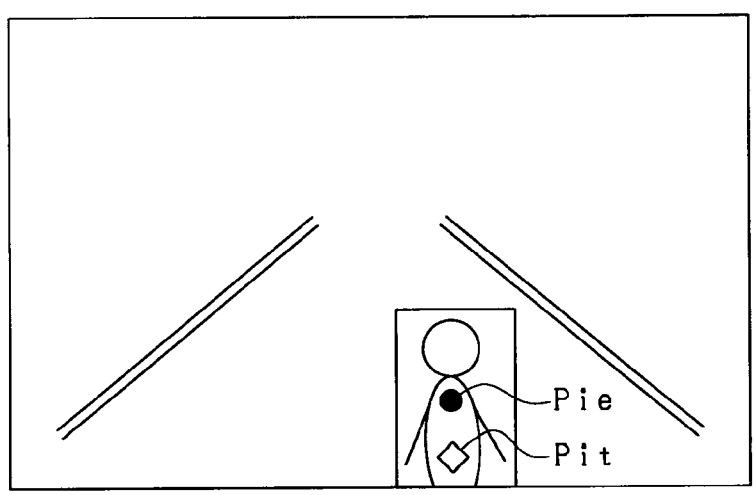

FIG.7
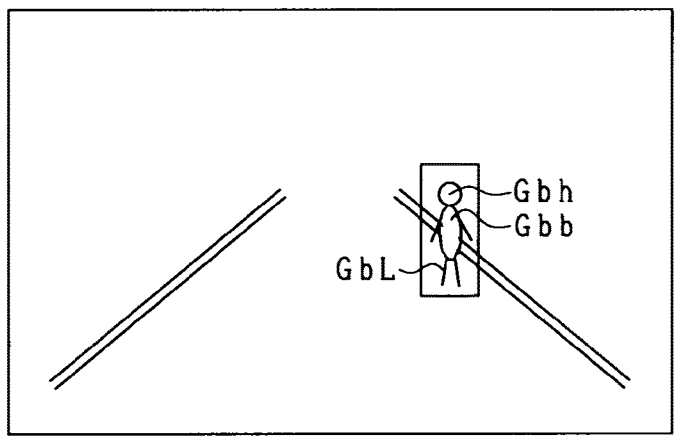
(a)
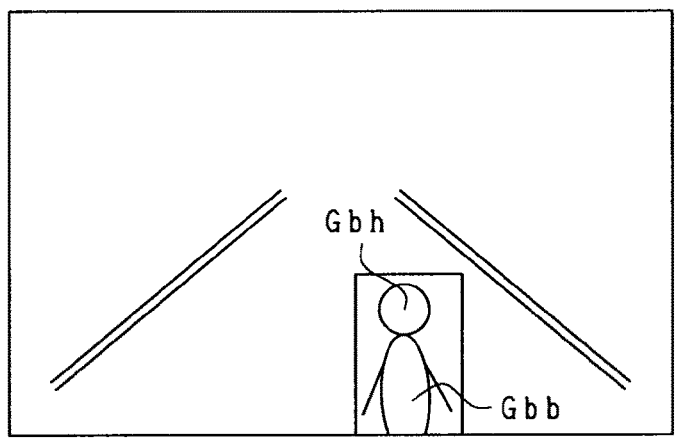
(b)
FIG.8
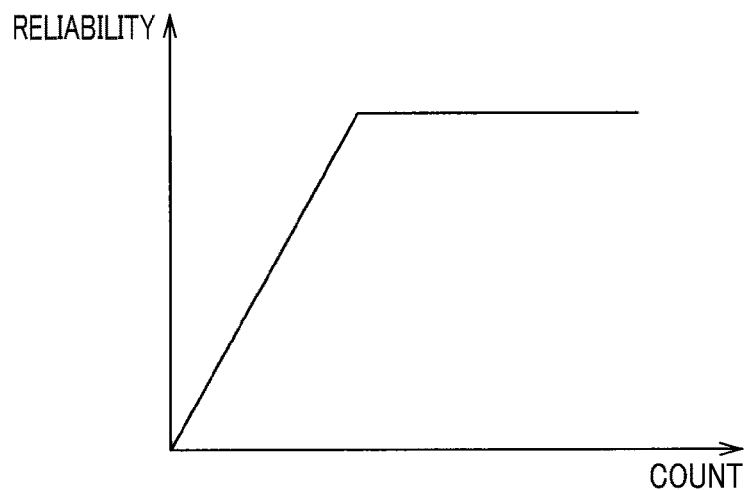

FIG.9
(a)
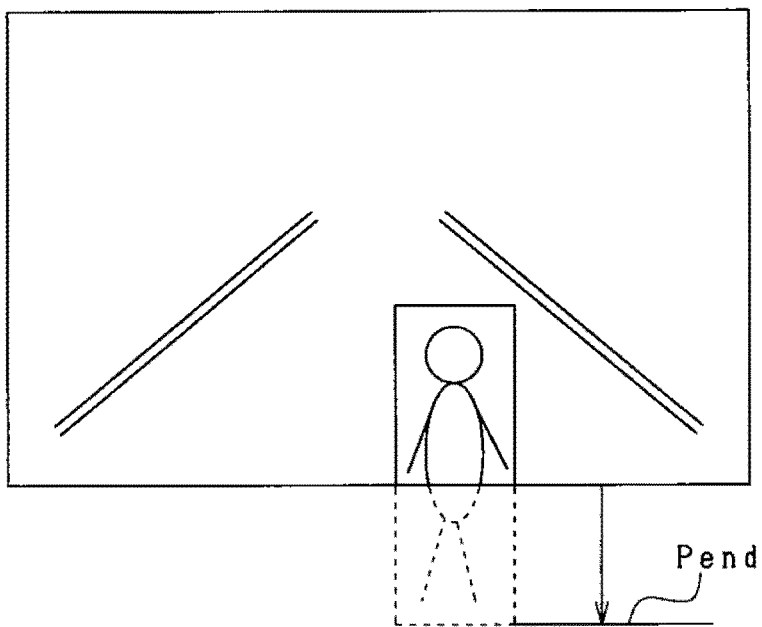
(b)
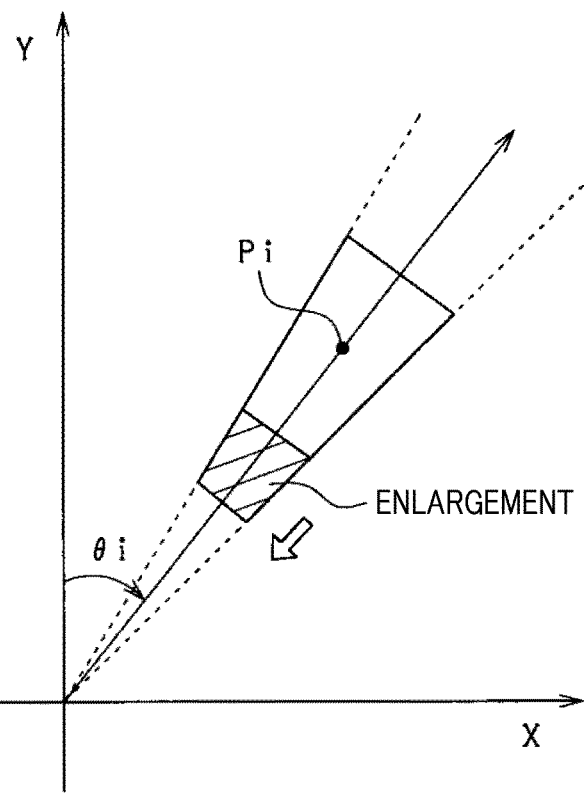

FIG.10
(a)
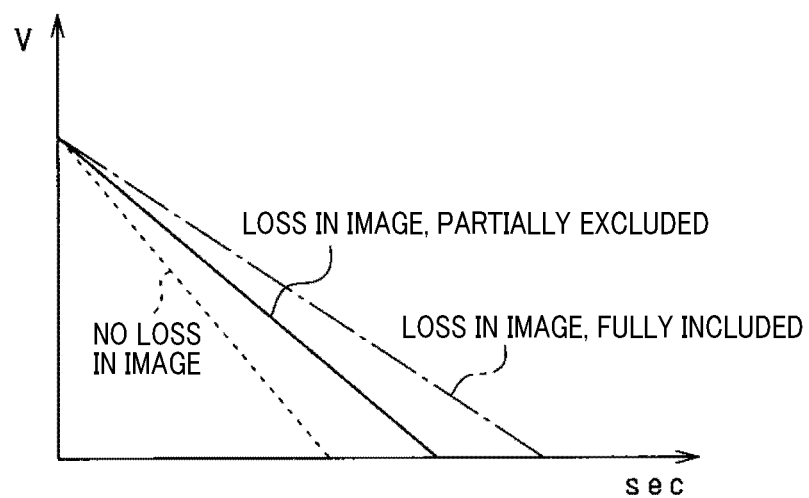
(b)
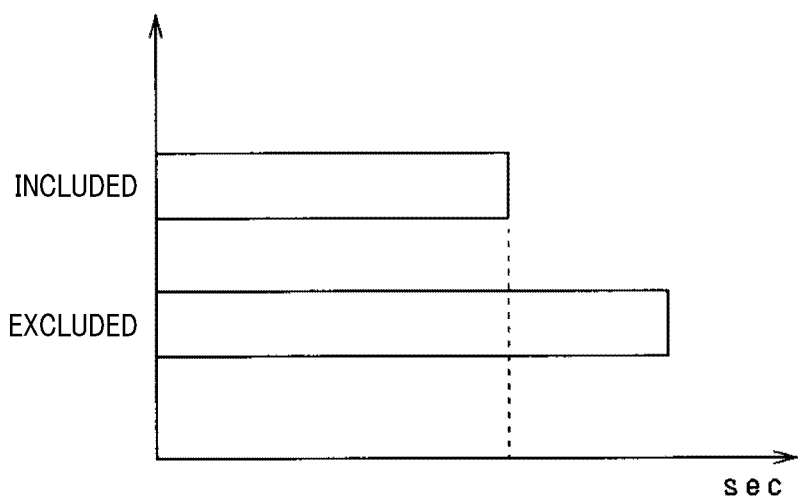

FIG.12
(a)
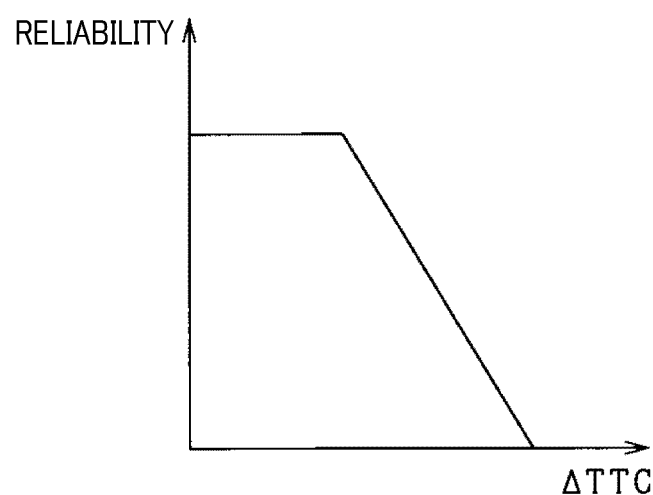
(b)
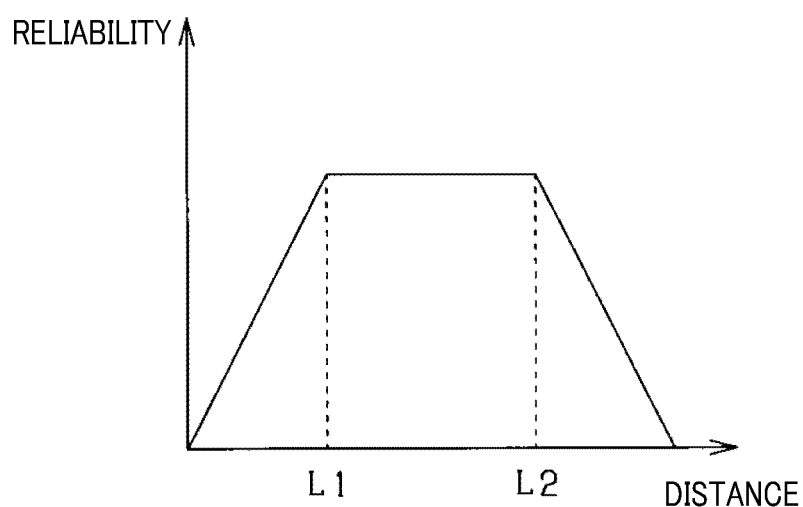

VEHICLE CONTROL APPARATUS AND VEHICLE CONTROL METHOD

CROSS REFERENCE TO RELATED APPLICATION

The present application is a national stage application of PCT Application No. PCT/JP2017/037064, filed on Oct. 12, 2017, which claims priority to Japanese Patent Application No. 2016-205051 filed Oct. 19, 2016, the description of which is incorporated herein by reference. Also, any applications for which a foreign or domestic priority claim is identified in the Application Data Sheet as filed with the present application are hereby incorporated by reference under 37 CFR 1.57.

TECHNICAL FIELD

The present invention relates to a vehicle control apparatus and a vehicle control method which are for detecting an object by using a combination of an electromagnetic wave sensor and an image sensor.

BACKGROUND ART

Conventionally, there has been known a vehicle control apparatus which uses both an electromagnetic wave sensor and an image sensor and is designed for detecting objects which are present in front of a vehicle provided with the apparatus.

Practically, the electromagnetic wave sensor detects positions of objects and the image sensor acquires an image to detect positions of objects. These positions are used in a determination condition to determine whether or not objects sensed by the respective sensors represent the same.

In PTL 1, there is disclosed an apparatus in which a mutual proximity of positions of objects respectively detected by the electromagnetic wave sensor and the acquired image, is set as a determination condition to determine whether or not the detected objects represent the same object.

Further, in the apparatus disclosed in PTL 1, in addition to the above-described determination condition, there is another determination condition to determine whether or not objects represent the same object. This determination condition is based on a difference between two periods of time and a predetermined threshold. One period of time is estimated as being required for the vehicle, which is calculated based on a current position of an object detected by the electromagnetic wave sensor, will collide with an object. The other period of time is estimated as being required for the vehicle, which is calculated based on current position detected from acquired images, will collide with an object. If a difference between both periods of time is equal to or less than the threshold, it is determined that both objects represent the same object.

CITATION LIST

Patent Literature

[Patent Literature]
JP 2016-66182 A

SUMMARY

Incidentally, when calculating the position of an object using the acquired images, a known pattern matching process can be used for recognizing an object, for example.

Since the pattern matching process can recognize an object even when the whole image of an object is not included in the acquired images, the object may be recognized only when a part of the object is outside the images.

As a result, an object recognized in the state of being partially excluded from the acquired images tends to deviate when being compared to the object with its whole image being recognized in the acquired images. This causes a deviation in the calculated position in the images.

Due to this deviation, two objects which are highly likely to represent the same object may be erroneously determined as different objects in the determination process for determining whether or not they represent the same object.

The present disclosure has been made in view of the above described problems, and a purpose thereof is to provide a vehicle control apparatus and a vehicle control method, which are for detecting an object by using both an electromagnetic wave sensor and an image sensor, and which is possible to minimize a decrease in determination accuracy as to whether or not the detected objects represent the same object.

The present disclosure relates to a vehicle control apparatus including an object determination unit that determines whether or not objects represent a same object based on a first position at which an object which exists in a field in front of a own vehicle is detected by an electromagnetic wave sensor and a second position of an object detected from an image of a forward view of the own vehicle, the image being acquired by an image sensor.

The vehicle control apparatus further includes: an image determination unit that determines whether or not a part of the object is excluded from the acquired image, in which the object has been detected from the acquired image but a part of the object is outside an imaging region of the image sensor; and a determination condition change unit that changes a determination condition used for determining whether or not the objects represent the same object such that an object determined to be excluded from the acquired image is easier to be determined as the same object compared to an object determined not to be excluded from the acquired image.

An object of which a part is located outside the imaging region of the image sensor may have a second position detected from the acquired image differently from a true position thereof.

In this regard, according to the above-described configuration of the present disclosure, it is determined whether or not a part of the object detected from the acquired image is included in the acquired image. That is, it is checked whether a part of the object is outside the imaging region of the image sensor.

The determination condition is changed such that an object which is determined to be partially excluded from the acquired image can be more easily determined as the same object as an object obtained by the electromagnetic wave sensor, compared to a case where an object is determined not to be partially excluded from the acquired image.

In this case, even when an error occurs in the second position because a part of the object is positioned outside the imaging region, it is possible to minimize cases where the object from the acquired image is determined as a different object, and to minimize deterioration of the determination accuracy as to whether or not the objects represent the same object.

BRIEF DESCRIPTION OF THE DRAWINGS

Referring to the accompanying drawings, specific description will be provided below to clarify the above object and other objects, characteristics and advantageous effects of the present disclosure.

In the accompanying drawings:

FIG. 2 is a diagram which describes detection of an object;

FIG. 3 is a diagram which describes collision determination;

FIG. 4 is a diagram which describes detection of a second position;

FIG. 7 is a diagram which describes a method for determining a pedestrian whose part is not included in an acquired image;

FIG. 8 is a diagram which describes the reliability of the determination as to whether or not the objects represent the same object;

FIG. 9 is a diagram which describes the change of the determination condition;

FIG. 10 is a diagram which describes collision avoidance control in a complementary mode according to a second embodiment;

FIG. 12 is a diagram which describes a method of calculating the reliability.

DESCRIPTION OF THE EMBODIMENTS

Figure 1:
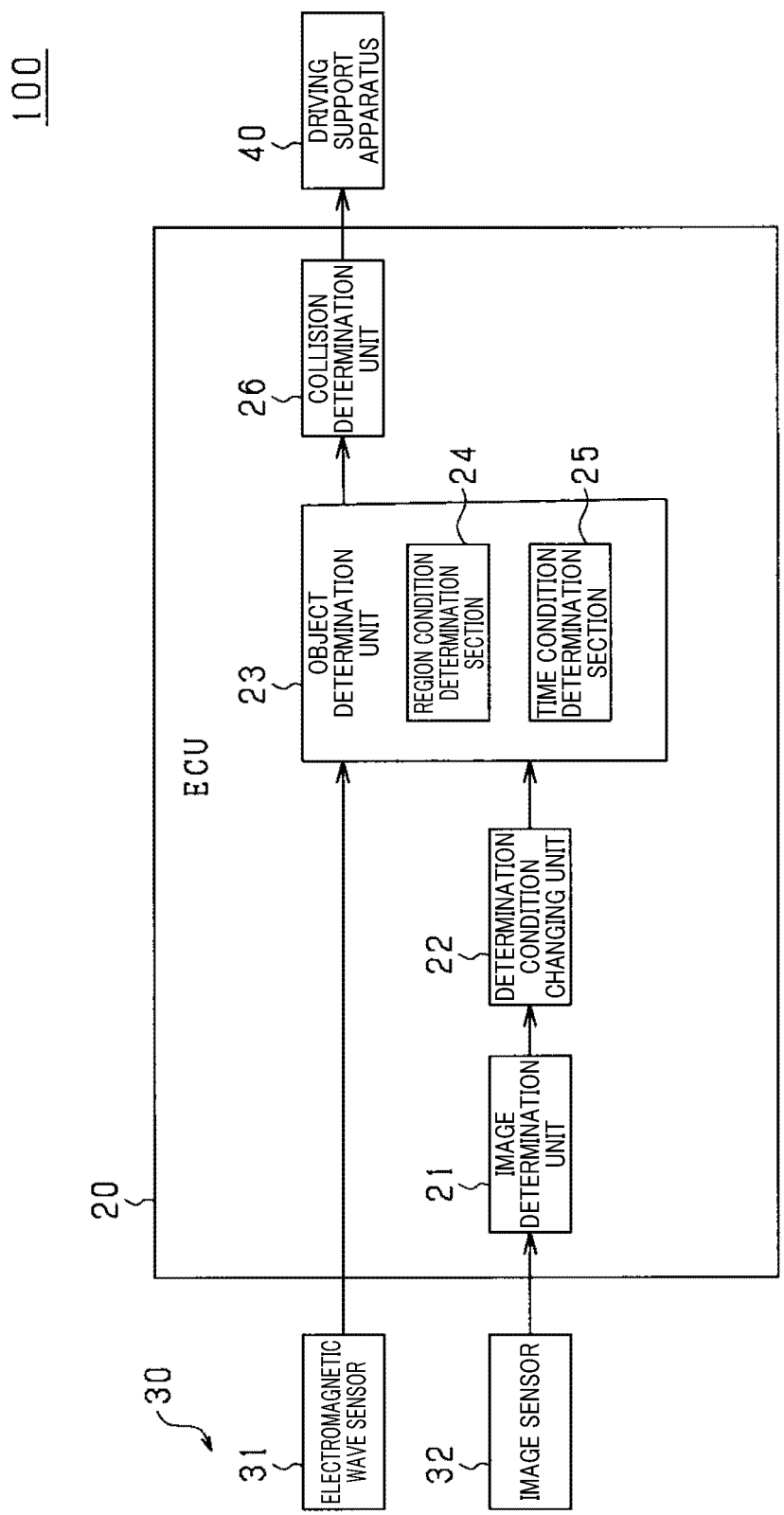
FIG. 1 is a diagram which describes a configuration of a vehicle control apparatus.

With reference to the drawings, embodiments of a vehicle control apparatus and a vehicle control method will be described below. In the following embodiments, components that are the same or equivalent to each other are given the same reference signs in the drawings. For the components having the same reference signs, descriptions in the specification should be referred to previous ones.

First Embodiment

As shown in FIG. 1, the vehicle control apparatus 100 is mounted on a vehicle and detects objects which are present in front of the vehicle.

Then, when there is a possibility that an object collides with the vehicle, the operation of avoiding the collision between the own vehicle provided with the apparatus 100 and the object or the operation of alleviating the collision is performed.

As shown in FIG. 1, the vehicle control apparatus 100 includes various types of sensors 30, an ECU (Electronic Control Unit) 20, and a driving support device 40.

The various types of sensors 30 are communicably connected to the ECU 20, and outputs its detected results of objects to the ECU 20.

In FIG. 1, the various types of sensors 30 include an electromagnetic wave sensor 31 and an image sensor 32 for acquiring images.

When, in the following description, it is necessary to distinguish an object detected from by the electromagnetic wave sensor 31 and from an object detected from the acquired images acquired by the image sensor 32, the object detected by the electromagnetic wave sensor 31 is referred to as an electromagnetic wave target, and the object detected from the acquired image is referred to as an image target.

The electromagnetic wave sensor 31 is configured to transmit a transmission wave having directivity such as that gained by a millimeter wave, a radar, or the like. In addition, the electromagnetic wave sensor 31 is configured to detect the position of an object or a relative speed with respect to the own vehicle, based on a reflected wave reflected from an electromagnetic wave target in response to the transmission of the transmission wave.

For example, the electromagnetic wave sensor 31 performs transmission of a transmission wave or reception of a reflected wave by scanning the antenna in the horizontal direction with respect to the own vehicle.

The image sensor 32 is arranged in frontal part of the own vehicle CS, acquires an image viewed forward from the own vehicle CS, and outputs data indicative of the acquired image to the ECU 20 at a predetermined cycle.

The image sensor 32 is configured to include arrangement of a necessary number of image pickup devices such as a CCDs (Charge coupled devices) or the like vertically and horizontally. The necessary number depends on a desired resolution.

The respective images acquired by the image sensor 32 are formed by pixels corresponding to the resolution of the image sensor 32.

In this embodiment, the image sensor 32 is described as a single lens camera, but a stereo camera may be used as the image sensor 32.

The ECU 20 is configured as a known computer including various components such as a CPU, a ROM, and a RAM.

The CPU is configured to, at intervals, execute programs previously stored in the ROM, thereby realizing the functions for detecting objects which may be present in front of the own vehicle and determining the possibility of collision of the own vehicle with such objects based on positions of the detected objects.

Among functional units of the ECU 20, an object determining unit 23 is configured to determine whether or not objects represent the same object based on a determination condition. This determination condition is based a first position at which an object which exists or may exist in a front view spreading in front of the own vehicle is detected by the electromagnetic wave sensor 31 and a second position of an object detected from the acquired image obtained by capturing an object which exists or may exist in a front view spreading in front of the own vehicle by the image sensor 32.

In this embodiment, the object determining unit 23 includes a region condition determining unit 24 and a time condition determining unit 25, and determines whether or not objects represent the same object, based on a determination condition set by the region condition determining unit 24 and a determination condition set by the time condition determining unit 25.

First, the first position and the second position, which are used for determining whether or not objects represent the same object, will now be described.

As shown in part (a) of FIG. 2, a first position Pr is a detected position of an object detected by the electromagnetic wave sensor 31, and is detected as a position on an XY plane. In this plane, the lateral direction of the vehicle is assigned to the X direction and the traveling direction of the vehicle is assigned to the Y direction.

The first position Pr includes, as information thereof, both a relative distance r1 from the own vehicle to the object, and an azimuth θr centered on the own vehicle.

In the XY plane of part (a) of FIG. 2, on the tip of the own vehicle CS, a position at which the electromagnetic wave sensor 31 is arranged is referred as a reference point Po.

As shown in part (a) of FIG. 2, a second position is a detected position of an object based on the acquired image, and is detected as a position on the XY plane.

The second position Pi includes, as information thereof, both a relative distance r2 from the own vehicle to an object and an azimuth θi centered on the own vehicle, and is detected as a position on the XY plane similarly to the first position Pr.

Of the second position, the relative distance r2 is calculated based on the lower end of an object recognized in the acquired image. Specifically, from the acquired images, the object determining unit 23 recognizes an object by pattern matching process using a dictionary registered in advance.

The dictionary is prepared for each type of object.

Further, as shown in part (b) of FIG. 2, of the second position, the object determination unit 23 calculates a relative distance r2 based on a ratio between the length D1 to the length D2. The length D1 is a length from a position Pend of the lower end of an object recognized in the acquired image to the lower end of the acquired image, whereas the length D2 is a length from a vanishing point (Focus of Expansion; FOE) previously calculated in the acquired image to the lower end of the acquired image.

The position Pend of the lower end of the object in the acquired image can be calculated based on the number i in the horizontal direction and the number j in the vertical direction of the pixels constituting the acquired image.

For example, when the coordinate (i, j) of the upper left apex O in the acquired image shown in part (b) of FIG. 2 is (0, 0), the length D1 can be calculated by the number of pixels from the position Pend of the lower end of the object to the lower end of the acquired image in the vertical direction.

Similarly, the length D2 can be calculated by the number of pixels from the vanishing point FOE to the lower end of the acquired image in the vertical direction.

The calculation of the FOE in the acquired image is performed by a known learning process.

For example, the estimated position of the vanishing point FOE is calculated by recognizing the partition lines LIN located on the left and right sides of the own vehicle from the acquired image and obtaining the intersection points on the extension lines of these partition lines LIN.

Then, a known optical flow is calculated for predetermined stationary objects or the like, and the estimated positions are corrected based on the optical flow to learn an appropriate position of the vanishing point FOE.

It is detected that stationary objects, such as a partition line, a tree or others, move to emerge from the vanishing point.

Therefore, the appearance points of these stationary objects are detected a plurality of number of times, and learning is performed so that the estimated position of the vanishing point FOE becomes an appropriate position based on each detected appearance point.

The region condition determination unit 24 is configured to determine whether or not objects represent the same object by a determination condition. The determination condition is a condition that there must be a region overlapping both the electromagnetic wave search region calculated based on the first position and the image search region calculated based on the second position.

In part (a) of FIG. 2, since the region OL overlapping between the electromagnetic wave search region Rr and the image search region Ri exists, the region condition determination unit 24 determines that the electromagnetic wave target and the image target represent the same object.

As shown in part (a) of FIG. 2, the electromagnetic wave search region Rr is a region having a width corresponding to a predefined possible error based on the characteristics of the electromagnetic wave sensor 31 in each of the distance directions and each of the azimuth directions with reference to the first position Pr.

For example, the electromagnetic wave search region Rr is set as a range extending by a possible error in the distance directions and a possible error in the angles in the azimuth directions with reference to the first position Pr(r1, θr).

The image search region Ri is a region having a width corresponding to a predefined possible error based on the characteristics of the image sensor 32 in each of the distance directions and each of the azimuth directions with reference to the second position Pi.

For example, in part (a) of FIG. 2, it is set as a region extended depending on a possible error in the distance directions and a possible error in the angles in the azimuth directions with reference to the second position Pi(r2, θi).

The time condition determination unit 25 is configured to determine whether or not objects represent the same object. The determination is made under a determination condition that a difference between an electromagnetic wave prediction time TTC (Time to Collision) 1 calculated by the first position and the second position, and an image prediction time TTC2 is equal to or less than a determination threshold Thd.

As shown in part (a) of FIG. 3, the electromagnetic wave predicted time TTC1 is an evaluation value indicating a remaining number of seconds before the own vehicle will collides with the electromagnetic wave target when the own vehicle continues to travel at the current speed. The evaluation value is calculated by dividing the relative distance r1 extending from the own vehicle to the electromagnetic wave target, which is calculated based on the first position, by the relative speed of the electromagnetic wave target with respect to the own vehicle.

Further, the image predicted time TTC2 is an evaluation value indicating a remaining number of seconds before the own vehicle collides with the image target when the own vehicle continues to travel at the current speed. The evaluation value is calculated by dividing the relative distance r2 extending from the own vehicle to the image target calculated based on the second position, by the relative speed of the image target with respect to the own vehicle.

When the difference ΔTTC between the electromagnetic wave prediction time TTC1 and the image prediction time TTC2 is equal to or smaller than the determination threshold Thd, it is determined that the electromagnetic wave target and the image target represent the same object.

When the object determining unit 23 determines that the electromagnetic wave target and the image target represent the same object, the collision determination unit 26 is configured to fuse the first position and the second position to calculate a single fusion (fused, i.e., united) position which is new position information for the object which has been determined as the same object.

For example, a fusion position (r1, θi) is calculated by mutually merging the high-precision relative distance r1 derived from the first position (r1, θr) and the high-precision azimuth θi derived from the second position (r2, θi).

Hereinafter, when the object determination unit 23 determined the same object, the objects whose fusion positions have been calculated as a fusion (fused, i.e. united) target.

In addition, the collision determination unit 26 is configured to determine whether or not an object collides with the own vehicle based on the plurality of fusion positions.

For example, the collision determination unit 26 calculates a movement trajectory of an object determined as a fusion target based on a plurality of fusion positions having different time series, and extends the movement trajectory toward the own vehicle to calculate a future position of the object.

In part (b) of FIG. 3, the future position Fp is calculated by extending the movement trajectory calculated based on the fusion position, from each of the times t1 to t4 toward the own vehicle. When the calculated future position is within a collision lateral position CSP which is set for the own vehicle, it is determined that there is a possibility of a collision occurring between the object and the own vehicle.

The collision lateral position CSP is a range extending in the lateral direction (X direction) from the center of the own vehicle in the front portion of the own vehicle.

The collision determination unit 26 may determine whether or not an object collides with the own vehicle by calculating the predicted collision time TTC3 indicating the possibility that the own vehicle collides with the object whose future position has been calculated. The predicted collision-time TTC3 is calculated by dividing the fusion position indicating the current position of the object by the relative velocity of the object relative to the own vehicle.

In addition to calculating the future position, the collision determination unit 26 may calculate the position in the lateral direction indicating the vehicle width of the object among the objects determined as the fusion target, and determine the possibility of a collision occurring between the object and the own vehicle based on the lateral position.

The driving support device 40 is a warning device that emits a warning sound to the driver or a brake device that decelerates the speed of the own vehicle, and performs a collision avoidance operation and a collision reduction operation with an object based on a result of determination by the collision determination unit.

If the driving support device 40 is a braking device, the automatic braking is activated when it is determined that the own vehicle collides with the fusion target.

If the driving support device 40 is a warning device, a warning sound is generated when it is determined that the own vehicle collides with the fusion target.

In part (a) of FIG. 4 shows an electromagnetic wave detection region A1 which is a field region in front of the own vehicle, in which an object (a first object) can be detected by the electromagnetic wave sensor 31, while an imaging region A2 which is a field region in front of the own vehicle, in which an image with an object (a second object) can be acquired by the image sensor 32.

In this embodiment, the imaging region A2 is a region narrower in the front/rear direction in front of the own vehicle than the electromagnetic wave detection region A1.

In addition, among the regions lying in front of the own vehicle, a region located in the vicinity and a region located in the distance are regions in each of which an object can be detected by the electromagnetic wave sensor 31, but cannot be recognized from the acquired image acquired by the image sensor 32.

Therefore, if an object is positioned at each of the positions in the vicinity field and the distant field in front of the own vehicle, the first position can be detected, but the second position cannot be detected.

The second position of the object detected using the acquired images is calculated based on the position of the lower end of the object recognized in the acquired images.

In this calculation, since the lower part of the object positioned in front of the own vehicle is positioned outside the imaging region A2 of the image sensor 32, even when a part of the object is not included in the acquired image, the object determination unit 23 may recognize an image target Gb by the pattern matching process as shown in part (b) of FIG. 4.

In such a case, the second position Pie of the object is calculated based on the position of the lower end of the acquired images.

Therefore, the second position Pie, which is calculated in a state where the lower part of the object is not included in the acquired images, is calculated at a position different from a true value (position) Pit.

In such a case, when a deviation between the object detected from the second position and the object detected from the first position becomes large, these two detected objects which represent the same object may erroneously be determined as mutually different objects.

Therefore, in the present embodiment, the ECU 20 includes an image determination unit 21 and a determination condition changing unit 22.

Since an object is detected from the acquired images but a part of the object is outside the imaging region of the image sensor 32, the image determination unit 21 determines whether or not the part of the object is partially excluded from the acquired image.

In this embodiment, since the second position is calculated based on the position of the lower end portion of the object, the image determination unit 21 determines whether or not the lower part of the object is outside the imaging region.

The determination condition changing unit 22 is configured to change the determination condition such that the object determined by the image determination unit 21 to be partially excluded from the acquired image can be determined more easily to be the same object, compared with an object determined not to be partially included in the acquired image.

In the present embodiment, the determination condition changing unit 22 enlarges the image search region in the distance direction such that the image search region and the electromagnetic wave search region can easily overlap with each other. This allows the detected objects to be determined as being the same object.

Further, by increasing the determination threshold for comparing the difference between the electromagnetic wave prediction time and the image prediction time, it becomes easier to determine that the detected objects represent the same object.

Figure 5:
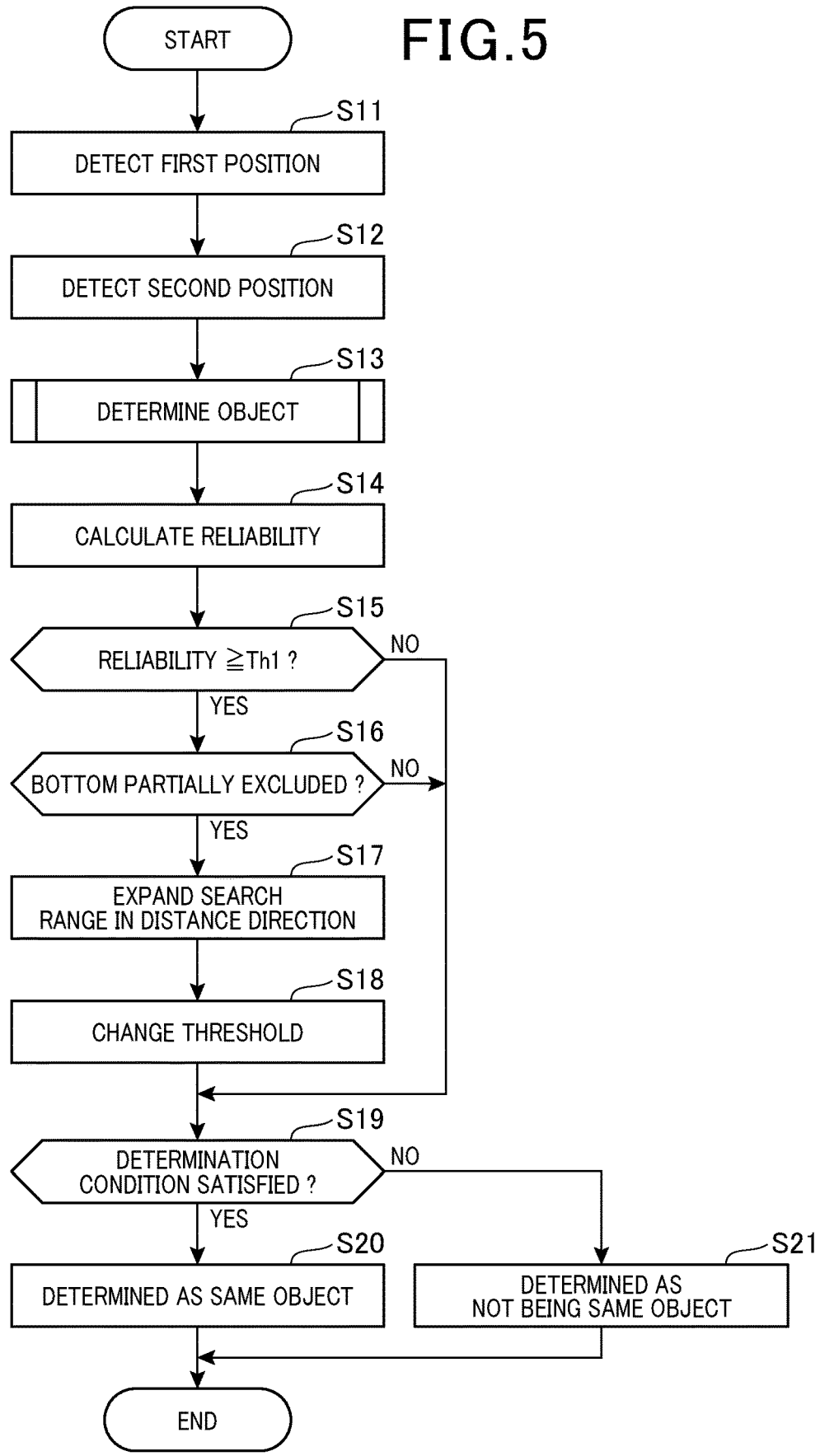
FIG. 5 is a flowchart which describes a determination method as to whether or not the objects represent the same object.

With reference to FIG. 5, how a determination method is performed by the ECU 20 will now be described, practically, in terms of whether or not objects represent the same object. The process shown in FIG. 5 is performed at a predetermined cycle by the ECU 20.

In this example, there is described a case where a pedestrian positioned in front of the own vehicle is a target to be detected, i.e., a detection target.

First, in step S11, a first position, which is a detection result of the electromagnetic wave target by the electromagnetic wave sensor 31, is acquired.

In step S12, the second position, which is the detection result of the image target by the acquired image, is acquired.

In step S13, it is determined whether or not the pedestrian whose second position has been detected becomes a target to which the determination condition of the same determination is to be changed.

Figure 6:
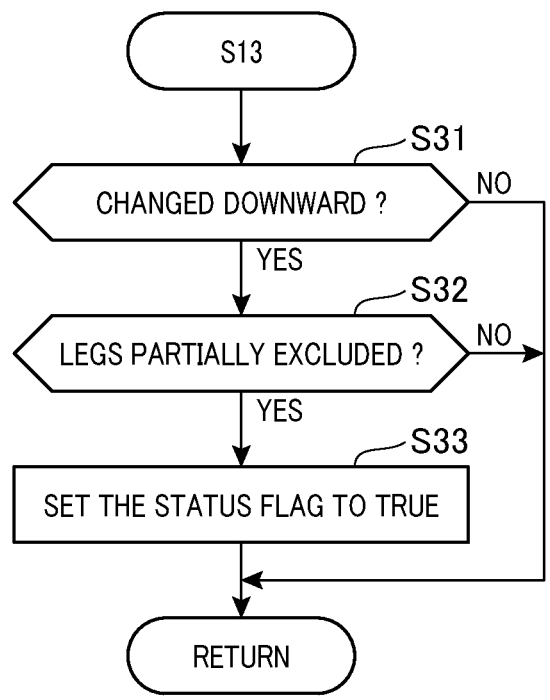
FIG. 6 is a flowchart which shows in detail a process in step S13 of FIG. 5.

FIG. 6 is a flowchart illustrating the process of step S13 in detail. In the process shown in FIG. 6, a pedestrian is set as a detection target, where the pedestrian's legs are not included in the acquired image due to a pedestrian's positional approach to the own vehicle.

In step S31, the direction of the positional changes of the pedestrian on the acquired images is determined for the pedestrian to which the second position has been detected.

Specifically, a feature point of the pedestrian to which the second position has been detected is extracted, and the direction of the positional changes of the pedestrian on the acquired images is determined based on an optical flow indicating a time-series change of the feature points.

For example, an edge point indicating a contour of the pedestrian can be used as the feature point.

Step S31 functionally corresponds to the direction determination unit.

If the direction of the positional changes of the pedestrian on the acquired images is downward, it can be determined that the pedestrian is approaching the own vehicle.

On the other hand, if the direction of the positional changes on the acquired images of the pedestrian is other than the downward direction, it can be determined that the pedestrian is moving away from the own vehicle.

In this embodiment, when the direction of the positional changes of the pedestrian on the acquired images is detected as the lateral direction or the upward direction, the ECU 20 determines that the direction of the positional changes is other than the downward direction.

If the direction of the positional changes of the pedestrian on the acquired images is other than the downward direction (NO in step S31), the process shown in FIG. 6 is terminated and the process returns to FIG. 5 because the pedestrian is not approaching the own vehicle.

On the other hand, if the direction of the positional changes of the pedestrian on the acquired images is downward (YES in step S31), since the pedestrian is approaching the own vehicle, in step S32, it is determined whether or not the legs, which compose the lower portion of the pedestrian, is included in the acquired images, i.e., the overall pedestrian is included in the acquired images.

For example, the ECU 20 includes a dictionary for recognizing the upper body and the lower body of a pedestrian among dictionary data used for pattern matching.

Therefore, by using both dictionary data for the upper body and dictionary data for the lower body of the pedestrian, it is determined whether or not the legs of the pedestrian is not included. Specifically, even if a pedestrian whose upper body is recognized by the dictionary for the upper body but this pedestrian's lower body cannot be recognized by the dictionary for the lower body, it is determined that the pedestrian's legs are not included in the currently acquired image.

Step S32 functionally corresponds to an image determination process.

In the dictionary for the upper body of the pedestrian, predicable feature amounts, which correspond to the head and the body of the pedestrian, are registered.

Accordingly, as shown in parts (a) and (b) of FIG. 7, using the pedestrian's upper body dictionary, at least, the head Gbh and the body Gbb of the pedestrian is recognized in the acquired images.

In the dictionary for the lower body of the pedestrian, feature amounts which correspond to the legs of the pedestrian are registered.

Therefore, by performing the pattern matching using the dictionary for the lower body, the pedestrian with their legs GbL included in the image is recognized, as shown in part (a) of FIG. 7, but the pedestrian with their legs GbL not included in the image is not recognized, as shown in part (b) of FIG. 7.

Note that the respective feature amounts of the head, body, and legs used in the dictionary may be updated to optimum values based on a known learning process, not limited to using fixed values.

If the legs of the pedestrian are included (NO in step S32), the process shown in FIG. 6 is terminated, and the process returns to FIG. 5.

On the other hand, if the legs of the pedestrian are not included (YES in step S32), it is determined in step S33 that the lower part of the pedestrian is outside the imaging region.

For example, a status flag indicating that the lower part of the pedestrian is outside the imaging region is set to a true value, then the process shown in FIG. 6 is terminated.

Returning to FIG. 5, in step S14, the reliability of the same determination for the pedestrian based on the first position and the second position is calculated.

In a case where the determination condition is unnecessarily changed under a low reliability of the same-object determination, accuracy of the determination may be lowered further on the contrary to control purpose.

In the embodiment, the reliability is an index value indicating the likelihood of the same-object determination performed based on the first position and the second position. In the first embodiment, the ECU 20 is configured to calculate the reliability based on the number of times how many the pedestrian has been continuously determined as being the same object in the processes performed prior to the current process.

The reason is that the possibility that the image target and the electromagnetic wave target represent the same object increases, because a large number of times of determination indicates that the same-object determination has been stably performed.

Step S14 functionally corresponds to the reliability calculation unit.

As shown in FIG. 8, in this embodiment, as the number of times that pedestrians has been determined to be the same object increases, the value of the reliability is set to be increased.

For example, the ECU 20 records map information indicating a relationship between the reliability and the number of times determined as the same object, which is shown in FIG. 8, and acquires the reliability based on this map information.

If the reliability calculated in step S14 is less than a threshold Th1 (NO in step S15), the process proceeds to step S19.

On the other hand, if the reliability calculated in step S14 is equal to or greater than the threshold Th1 (YES in step S15), the process proceeds to step S16, and a value of the status flag is determined.

The threshold Th1 is a threshold for determining the reliability.

If the status flag, which indicates that the lower part of the pedestrian is not included in the current acquired image, is false (NO in step S16), the process proceeds to step S19.

On the other hand, if the status flag is true (YES in step S16), in steps S17 and S18, the determination condition is changed so that the pedestrian who has been determined that the lower part is not included in the acquired image can be more easily determined as the same object than a pedestrian who has been determined that the pedestrian's lower part is included in the acquired image.

Therefore, steps S17 and S18 functionally correspond to the determination condition changing process.

First, in step S17, the image search region is enlarged in the distance direction with respect to the pedestrian whose lower part is determined not to be included in the acquired image, compared with a pedestrian whose lower part is determined to be included in the acquired image.

In this embodiment, as shown in part (a) of FIG. 9, the length of the legs of the pedestrian, which is not included in the acquired image, is calculated, and an estimation value of the position Pend of the lower end of the pedestrian located outside the imaging region is calculated based on the calculated length of the legs.

Then, based on the calculated position Pend of the lower end, an enlargement amount of the image search range in the distance direction is calculated.

As a method of calculating the length of the legs which are not included in the acquired image, for example, the ECU 20 recognizes the lengths of the head and the body of the pedestrian by using a known pattern matching process based on the acquired image, and calculates the length of the legs which are not included in the acquired image based on the ratio of the lengths of the recognized portions.

Then, as shown in part (b) of FIG. 9, the image search range is enlarged in the distance direction in accordance with the estimated position of the lower end.

In this embodiment, the longer the length from the lower end in the acquired image to the estimated position of the pedestrian's lower end, the greater the amount of enlargement in the distance direction in the image search range.

In part (b) of FIG. 9, the image search range is enlarged to the side closer to the own vehicle in the distance direction.

In step S18, the determination threshold Thd is increased to make it easier for a pedestrian, whose lower part is determined to be only partially included in the acquired image, to be determined as the same object as a pedestrian whose lower part is determined to be included in the acquired image.

For example, the ECU 20 estimates the position of the lower end portion of the pedestrian, which lower end portion is positioned outside the imaging region. Then, the determination threshold Thd is increased based on the estimated position of the lower end portion.

Therefore, as the length estimated from the lower end of the acquired image to the lower end of the pedestrian is longer, an increased amount of the determination threshold Thd is set to be larger.

In step S19, it is determined whether or not the electromagnetic wave target detected at the first position represent the same object as the image target detected at the second position.

In this embodiment, the same-object determination for the pedestrians is performed when both the determination condition of whether or not there is a region overlapping with each search region and the determination condition of whether or not the difference between the number of prediction times is equal to or less than the determination threshold Thd are satisfied.

When the determination condition is changed in steps S17 and S18, it is further determined whether or not the objects represent the same based on the changed determination condition.

Therefore, by enlarging the image search region in the distance direction, it is more likely to generate a region overlapping with the electromagnetic wave search region.

Further, by increasing the determination threshold Thd, it becomes easy to determine that the difference between the electromagnetic wave prediction time and the image prediction time is smaller the determination threshold Thd.

When the determination condition for the same-object determination is established (YES in step S19), in step S20, the establishment flag indicating that the determination is established is set to be true.

On the other hand, when the determination that the objects are the same is not established (NO in step S19), the establishment flag is set to be false in step S21.

When the process of step S20 or step S21 is terminated, the process of FIG. 5 is temporarily terminated.

Therefore, if the establishment flag is true in step S20, a fusion position obtained by merging the first position and the second position with respect to the same pedestrian is calculated. On the other hand, if the establishment flag is false in step S21, the fusion position is not calculated.

Steps S19 to S21 functionally correspond to the object determination process.

The first embodiment described above has the following effects.

The ECU 20 determines whether or not a body part of the pedestrian is not included in the acquired image due to the fact that the body part of the pedestrian who has been detected at the second position is outside the imaging region of the image sensor 32.

Then, the determination condition is changed such that an object which is determined to be partially included in the acquired image can be determined as the same object easily, compared with an object which is determined to be included in the acquired image.

In this case, even when a part of an object is deviated from the imaging region so that the second position is erroneously detected, it can be avoided as much as possible that that object is erroneously determined as another object. It is therefore possible to reduce a decrease in the accuracy for the same-object degermation.

An object whose part is not included in the acquired image due to its position being closer to the own vehicle has a higher possibility of colliding with the own vehicle, compared to an object whose part is not included in the acquired image due to its position being distant.

In this regard, in the above-described configuration, on condition that the direction of the positional changes of the object on the acquired images is determined to be downward, the ECU 20 changes the determination condition so that the object determined to be partially included in the acquired image is more easily determined to be the same object than an object determined not to be partially included in the acquired image.

In this case, unnecessary operations of the collision avoidance control due to the relaxation of the determination condition can be minimized by changing the determination condition, so that it becomes easy to perform the same-object determination by limiting the distance from the own vehicle to an object that is approaching.

When both an electromagnetic wave search region and an image search region which extend in a predetermined range in the distance direction and the azimuth direction are calculated, and the existence of an overlapping region in each of the calculated search regions is used as a determination condition, the accuracy in obtaining the second position may be lowered. In such a case, the range in the distance direction of the image search region is not properly calculated and there is a possibility that the two search regions do not overlap with each other.

In this respect, in the above-described configuration, the ECU 20 enlarges the image search region in the distance direction, such that it is easier to the same-object determination can be performed based on the object that is determined to be partially excluded from the acquired image, compared to be based on an object that is determined not to be partially excluded from the acquired image.

In this case, the necessary procedure is to change the image search region in the distance direction with respect to the object determined to be partially excluded from the acquired image, and it is possible to easily determine that both objects represent the same object, by a simple method.

There is a probable case where the determination condition, which is a condition for determining whether or not the objects represent the same object, is that the difference between the electromagnetic wave prediction time calculated based on the first position and the image prediction time calculated based on the second position is equal to or less than the determination threshold. In such a case, if the calculation accuracy of the second position is low, an error occurs in the image prediction time calculated based on the second position, and the difference from the electromagnetic wave prediction time may become larger.

In this respect, in the above-described configuration, the ECU 20 increases the determination threshold with respect to the object determined to be partially excluded from the acquired image, thereby making it easier to determine the objects represent the same object, compared to an object determined not to be partially excluded in acquired images.

In this case, the determination threshold may be increased for an object determined to be partially excluded from the acquired image, and the same-object determination can be easily performed by a simplified method.

When the determination condition is unnecessarily changed under a low reliability for same-object determination, accuracy of the determination may be lowered on the contrary to control purpose.

In this regard, in the above-described configuration, the ECU 20 changes the determination condition for the object determined to be partially interrupted from the acquired image on the condition that the reliability is equal to or higher than the predetermined value.

In this case, deterioration in the determination accuracy, which is caused by changes of the determination condition, may be minimized.

Second Embodiment

In the second embodiment, in the process shown in FIG. 5, when an image loss occurs in a state where the second position is not detected after the objects are determined to be the same, the same-object determination is performed easier for the object whose lower part is not included in acquired images, compared to an object whose lower part is included in acquired images.

The image loss is a phenomenon in which the first position is continuously detected and the second position is not detected, after the objects have been determined to be the same.

First, the collision avoidance control performed when an image loss occurs will now be described.

In parts (a) and (b) of FIG. 10, there are provided diagrams each illustrating differences in braking force of the automatic brake, as an example of the collision avoidance control.

In part (a) of FIG. 10, the horizontal axis represents the time "sec", and the vertical axis represents transitions of the vehicle speed "V", whereby the braking force of the automatic brake is represented by an inclination of decrease amounts of the vehicle speed V after the automatic brake has been operated. That is, the greater the inclination, the higher the braking force of the automatic brake.

Objects previously determined to be the same may be present in front of the own vehicle, even when the second position is not detected. For this reason, with respect to the object in which the image loss has occurred, the ECU 20 continues the same-object determination for a predetermined period.

In addition, in a period in which the determination as the same object is continued after the image loss, the collision avoidance control is performed in a complementary mode.

In part (a) of FIG. 10, the braking force of the automatic brake is lowered for the object in which the image loss occurs, as compared with an object in which the image loss does not occur.

As an alternative, as the collision avoidance control, when the driving support device 40 emits a warning sound, the volume of the warning sound generated when an image loss occurs may be made smaller than a volume of the warning sound generated when the image loss does not occur.

The process of the ECU 20 according to the second embodiment will now be described with reference to FIG. 11.

Figure 11:
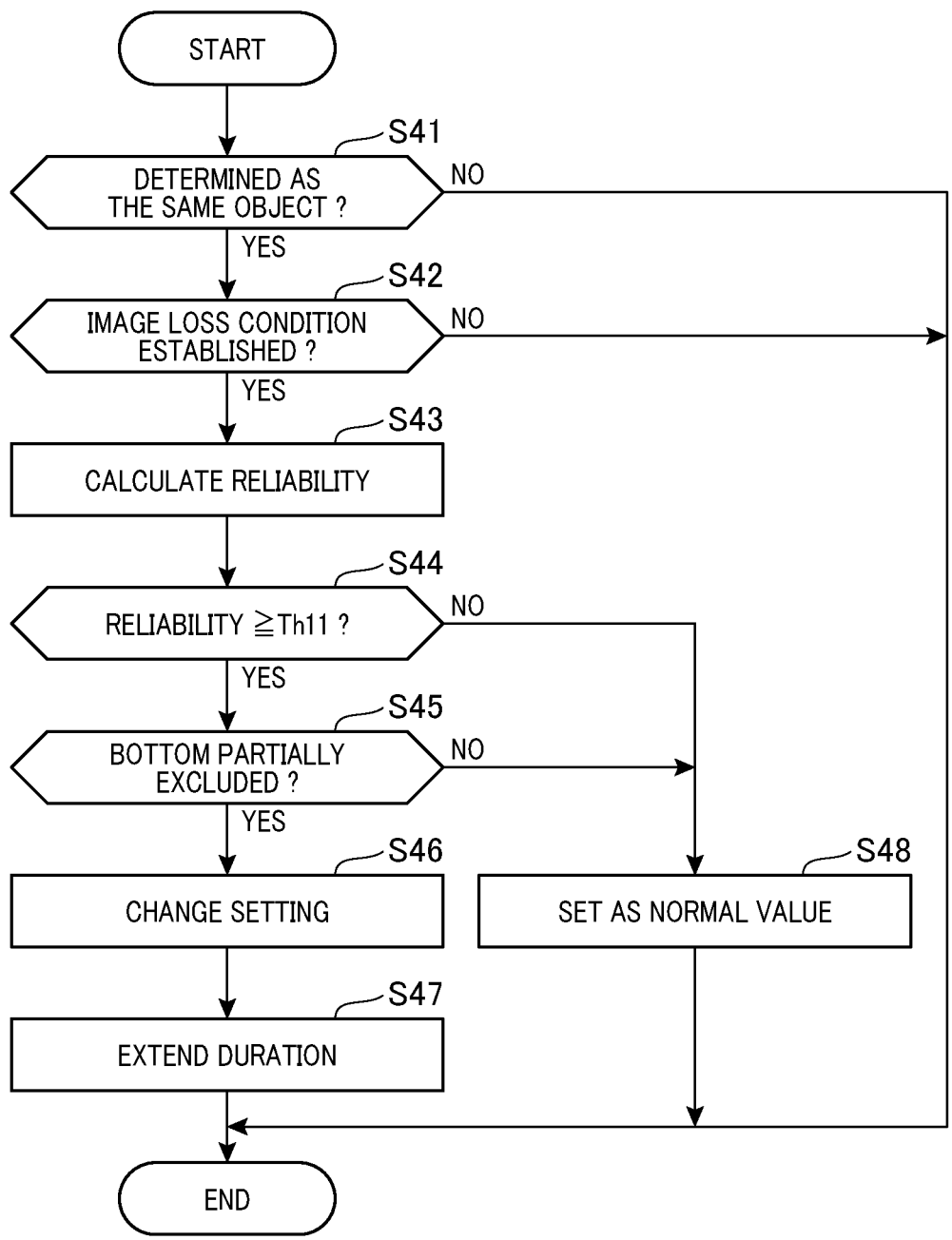
FIG. 11 is a flowchart which describes the process of an ECU 20 according to the second embodiment.

The process shown in FIG. 11 is a process performed by the ECU 20 at a predetermined cycle, after the performance of the same-object determination. In the second embodiment, a case where a pedestrian is targeted as an object will be described as an example.

In step S41, it is determined whether or not a pedestrian has been subjected to the same-object determination in the past.

For example, it is determined whether or not the establishment flag is true to indicate that the pedestrian has been determined as the fusion target. If it is determined that the pedestrian is not the fusion target (NO in step S41), the process of FIG. 11 is temporarily terminated.

If it is determined that pedestrians have represented the same pedestrian (YES in step S41), the establishment condition for the image loss is determined in step S42. Specifically, the establishment condition for the image loss is that the first position is continuously detected with respect to the object but the second position is not detected.

If the image loss is not caused (NO in step S42), the process of FIG. 11 is temporarily terminated.

Step S42 functionally corresponds to the image loss determination unit.

If an image loss has occurred (YES in step S42), the setting of a complementary mode to be executed for the pedestrian in which the image loss has occurred is performed in steps S43 to S48.

In this embodiment, both the ease of operations of the collision avoidance control and the duration of the continuous same-object determination of an object in which the image loss has occurred are set.

In step S43, the reliability indicating the reliability of the same-pedestrian determination is calculated.

In the second embodiment, as in S14 of FIG. 5, the ECU 20 also determines the reliability based on the number of times the determination of the fusion target continues.

When the reliability is equal to or higher than a threshold Th11 (YES in step S44), it is further determined in step S45 whether or not the lower part of the pedestrian is outside an acquired image.

In the second embodiment, the ECU 20 also determines whether or not the lower part of the pedestrian is included in the acquired image by using both the dictionary for the upper body and the dictionary for the lower body.

An image loss occurs when an object moves from within the imaging region of the electromagnetic wave sensor 31 to outside of the imaging region, so that the ECU 20 cannot recognize the object from the acquired image.

When the object is approaching the own vehicle, the area of the lower part of the pedestrian that is excluded from the imaging region increases in accordance to movements of the object. Therefore, it would be difficult for the ECU 20 to recognize the object.

Therefore, there is a high possibility that an object whose lower part is determined not to be included in the acquired image and whose image determined to have an image loss is located in the vicinity of the own vehicle.

On the other hand, for example, when the object moves laterally away from the own vehicle, parts other than the lower part are excluded from the acquired image in accordance with movements of the object, so that the ECU 20 cannot recognize the object.

Therefore, it is highly probable that a pedestrian who has been determined that the lower part thereof is included in the acquired image but has suffered from having the image loss is moving in a direction away from the own vehicle, being outside the imaging region.

When it is determined that the lower part of the pedestrian is excluded from the acquired image (YES in step S45), the process in step S46 is performed. In this process, the collision avoidance control for the pedestrian whose lower part is determined to be not included in the acquired image is carried out. This collision avoidance control is performed easier to operate, compared to collision avoidance control for the pedestrian whose lower part is determined to be included in the acquired image.

For example, when the automatic brake is operated as the collision avoidance control, as shown in part (a) of FIG. 10, the braking force of the automatic brake for the pedestrian whose lower part is determined not to be included in the acquired image is made higher than a braking force of the automatic brake for the pedestrian whose lower part is determined to be included in the acquired image.

In addition, as the collision avoidance control, when the driving support device 40 emits a warning sound, the volume of the warning sound for the pedestrian whose lower part is determined to be only partially included in the acquired image among the pedestrians in which the image loss occurs is made higher than the volume of the alarm sound for the pedestrian whose lower part is determined to be fully included in the acquired image.

On the other hand, when the reliability is less than the threshold Th11 (NO in step S44) or when it is determined that the lower part of the pedestrian is not excluded (NO in step S45), the process in step S48 is performed. In this process, the collision avoidance control for the pedestrian whose lower part is determined to be fully included in the acquired image is made harder to operate, compared to the collision avoidance control for the pedestrian whose lower part is determined not to be included in the acquired image.

Therefore, when the automatic braking is performed as the collision avoidance control, as shown in part (a) of FIG. 10, the braking force of the automatic braking is made lower than the braking force of the automatic braking for the pedestrian whose lower part is excluded from the acquired image.

In addition, when a warning sound is generated as the collision avoidance control, the volume of the warning sound is set lower than the volume of the warning sound for the pedestrian whose lower part is not included in the acquired image.

Steps S46 and S48 functionally correspond to the control unit.

In step S47, the pedestrian whose lower part is determined not to be included in the acquired image and whose image loss is determined to occur is made easier to continue the same-object determination, compared to the pedestrian whose lower part is determined to be included in the acquired image and whose image loss is determined to occur.

In this embodiment, by changing duration of the complementary mode longer, it makes easier to continue the same-object determination.

Step S47 functionally corresponds to the continuation condition changing unit.

When the process of step S47 or S48 is terminated, the process shown in FIG. 11 is temporarily terminated.

The second embodiment described above has the following effects.

It is highly likely that the object determined that the lower part thereof is excluded from the acquired image and that the image loss has occurred is located in the vicinity of the own vehicle, and the object determined that the lower part is not excluded from the acquired image and that the image loss has occurred is moving in the direction away from the own vehicle.

In this regard, in the above configuration, the ECU 20 makes it easier to continue the same-object determination for an object which is determined that the lower portion thereof is only partly included in the acquired image and that the image loss has occurred, compared with an object determined that the lower portion is included in the acquired image and that the image loss has occurred.

In this case, for an object that is highly likely to be present in front of the own vehicle, it becomes easier to continue the determination of whether the objects represent the same object, even after occurrence of the image loss. This reduces the collision avoidance control for the object from being stopped.

Even when objects are determined to be the same, if the reliability of this determination is low, it is easy to continue the same-object determination after occurrence of the image loss, which however results in causing one reason for non-operation of the collision avoidance control.

In this regard, in the above-described configuration, the ECU 20 determines that the lower part is not included in the acquired image and determines that the image loss has occurred, on condition that the reliability of the same-object determination is equal to or higher than the threshold, which makes it easier to continue the determination, compared with an object determined that the lower part thereof is included in the acquired image and that the image loss has occurred.

In this case, it is possible to minimize unnecessary operations of the collision avoidance control by continuing the same-object determination after occurrence of the image loss and by limiting the determination to a case where the reliability of the determination is high.

An object which has been subjected to occurrence of an image loss because the lower portion is not included in the acquired image is more likely to be positioned in front of the own vehicle even after the image loss, compared to an object in which an image loss occurs without determining that the lower portion is not included in the acquired image.

In this regard, in the above-described configuration, the ECU 20 makes it easier to operate the collision-avoidance control for an object whose lower portion is determined not to be included in the acquired image and whose image loss is determined to occur, as compared with an object whose lower portion is determined to be included in the acquired image and whose image loss is determined to occur.

In this case, it is possible to reduce the possibility that the collision avoidance control is inactive. The collision avoidance control is for an object which is likely to be in front of the own vehicle among the objects in which the image loss has occurred.

Other Embodiments

In the case where the same-object determination can be performed based on the determination condition which needs a difference between the electromagnetic wave prediction time TTC1 calculated by the first position and the image prediction time TTC2 calculated by the second position to be larger than the determination threshold, the reliability calculated in step S14 of FIG. 5 or step S43 of FIG. 11 may be calculated based on the difference between the respective prediction times.

In this case, as shown in part (a) of FIG. 12, the smaller the difference ΔTTC between the prediction times, the higher the reliability is calculated. For example, the ECU 20 records map information indicating the relationships between the reliability and the difference ΔTTC shown in part (a) of FIG. 12, and acquires the reliability based on the map information.

The reliability of the same-object determination may be calculated according to the distance from the own vehicle to an object. In this case, when the distance from the own vehicle to the object is short, the detection accuracy of the object detected by the electromagnetic wave sensor 31 is lowered, while when the distance from the own vehicle to the object is long, the detection accuracy of the object detected from the acquired image is lowered.

Therefore, as shown in part (b) of FIG. 12, in the short distance where the distance from the own vehicle to the object is equal to or less than a preset length L1, the shorter the distance, the lower the reliability.

Further, in a long distance in which the distance from the own vehicle to the object is equal to or greater than another preset length L2, the reliability is set to a higher value as the distance becomes longer. Note that the distance L2 is longer than the distance L1 from the own vehicle.

As another method of changing the determination condition, in addition to enlarging the image search region in the distance direction, the image search region may be offset in the distance direction on the XY plane.

In this case, in S17 of FIG. 5, the ECU 20 estimates the length of the lower part of the object that is not included in the acquired image, and calculates the position of the lower end of the object based on the estimated length of the lower part. Then, based on the calculated position of the lower end, an amount of the offset which offsets the image search range in the distance direction is calculated.

Instead of changing the enlargement amount of the image search region by the length of the lower portion which is partly included in the acquired image, the enlargement amount may be increased by a predetermined amount.

The second position may be calculated based on the position of the lower end and the position of the upper end of the object, in addition to the calculation based on the position of the lower end of the object recognized in the acquired image.

In this case, in addition to determining whether or not the lower part is not included in the acquired image as a part of the object, it may be determined that the part of the object is not included in the acquired image when the upper part of the object is not included in the acquired image.

As the determination condition of whether or not objects represent the same object, any one of determination conditions may be used. Such determination conditions are whether or not each search region overlaps, the determination of whether or not each prediction time is equal to or less than the determination threshold, and a combined use of determination for the search region overlap and the predation times.

In this case, in step S19 of FIG. 5, the determination as to whether or not the objects are the same is performed depending on whether each search region overlaps or whether a difference in the prediction times is equal to or less than the determination threshold.

In the second embodiment, as another example of facilitating the operations of the collision-avoidance control by the ECU 20, the operation of the autobrake may be advanced in timing.

In this instance, the ECU 20 makes it easier to operate the collision-avoidance control by temporally advancing the operation timings of the automatic braking of the object determined that the lower part is not included in the acquired image and that the image loss has occurred, as compared with an object determined that the lower part is included in the acquired image and that the image loss has occurred.

As another example of facilitating the operations of the collision-avoidance control by the ECU 20, the operation of the warning sound may be made earlier in timing.

As an antiinvasive to the object set forth in the foregoing embodiments, a bicycle may be assigned, instead of a pedestrian who serves as an object for the same-object determination. In this case, the ECU 20 uses a dictionary for bicycles instead of a dictionary for pedestrians.

The present disclosure has been described by way of examples; however, the present disclosure should not be construed as being limited to such examples or structures. The scope of the present disclosure should encompass various modifications or equivalents. In addition, various combinations or modes, and even other combinations or modes including one or more elements or one or less elements should fall within the scope and spirits of the present disclosure.

The invention claimed is:

1. A vehicle control apparatus comprising:
a processor;
a non-transitory computer-readable storage medium; and
a set of computer-executable instructions stored on the non-transitory computer-readable storage medium that cause the processor to:
determine whether or not an object at a first position and an object at a second position represent a same object based on the first position at which the object which exists in front of an own vehicle is detected by an electromagnetic wave sensor and the second position of the object detected from an image of a forward view of the own vehicle, the image being acquired by an image sensor;

determine whether or not a portion of the object is outside of an imaging region of the image sensor, in which the object has been detected from the acquired image; and change a determination condition in determining whether or not the object represents the same object based on whether or not a portion of the object is outside the imaging region of the image sensor, wherein:

a value of a parameter indicative of a positional relation, between the first position at which the object exists detected by the electromagnetic wave sensor and the second position at which the object exists detected by the image sensor, is calculated; and the set of computer-executable instructions further cause the processor to:
- determine whether the value of the parameter is less than a predetermined threshold, and determine that the object detected by the electromagnetic wave sensor and the object detected by the image sensor are the same object when it is determined that the value of the parameter is less than the predetermined threshold; and
- increase the predetermined threshold to be applied to a part of the object detected by the image sensor which is determined to be outside the imaging region of the image sensor, when it is determined that a part of the object detected by the image sensor is outside the imaging region of the image sensor.

2. The vehicle control apparatus according to claim 1, wherein the set of computer-executable instructions further cause the processor to:

determine a direction of positional changes of the object on the acquired image based on a plurality of acquired images acquired at different times; and change the determination condition in response to the direction of the positional changes of the object on the plurality of acquired images being determined to be downward.

3. The vehicle control apparatus according to claim 2, wherein the set of computer-executable instructions further cause the processor to:

determine whether or not a lower part of the object is excluded from the acquired image;

determine an object caused an image loss, provided that the object is first subjected to determination of the same object, and the first position is then continuously detected and the second position is not detected; and determine whether to continue determining whether or not the object represents the same object in response to determining whether or not the lower part of the object is excluded from the acquired image and determining that the object caused the image loss.

4. The vehicle control apparatus according to claim 3, wherein the set of computer-executable instructions further cause the processor to:

calculate, in response to determining that the object caused the image loss, a reliability of the same determination for the object based on the first position and the second position provided before the image loss occurs; and determine whether to continue determining whether or not the object represents the same object in response to determining whether or not the lower part of the object is excluded from the acquired image and determining that the object caused the image loss.

5. The vehicle control apparatus according to claim 3, wherein the set of computer-executable instructions further cause the processor to:

perform collision avoidance control for avoiding a collision of the own vehicle with objects determined as the same object; and advancing an operation timing of the collision avoidance control in response to determining that the lower part thereof is excluded from the acquired image and determining that the object caused the image loss.

6. The vehicle control apparatus according to claim 3, wherein the set of computer-executable instructions further cause the processor to:

calculate an electromagnetic wave search region and an image search region, and set, to the determination condition, a condition that there is a region which overlaps on both the calculated electromagnetic wave search region and the calculated image search region, the electromagnetic wave search region being a predetermined range i) defined based on, as a reference, the first position and ii) extending in both a direction along a distance from the own vehicle to the object and an azimuth direction from the own vehicle to the object, the image search region being a predetermined range defined based on, as a reference, the second position extending in the direction along the distance and the azimuth direction; and enlarge the image search region in the direction along the distance based on whether or not a portion of the object is outside the imaging region of the image sensor.

7. The vehicle control apparatus according to claim 2, wherein the set of computer-executable instructions further cause the processor to:

calculate an electromagnetic wave search region and an image search region, and set, to the determination condition, a condition that there is a region which overlaps on both the calculated electromagnetic wave search region and the calculated image search region, the electromagnetic wave search region being a predetermined range i) defined based on, as a reference, the first position and ii) extending in both a direction along a distance from the own vehicle to the object and an azimuth direction from the own vehicle to the object, the image search region being a predetermined range defined based on, as a reference, the second position extending in the direction along the distance and the azimuth direction; and enlarge the image search region in the direction along the distance based on whether or not a portion of the object is outside the imaging region of the image sensor.

8. The vehicle control apparatus according to claim 2, wherein the set of computer-executable instructions further cause the processor to:

calculate i) based on a first position, an electromagnetic wave prediction time which is a predicted time until the object collides with the own vehicle and ii) based on the second position, an image prediction time which is a predicted time until the object collides with the own vehicle; and set, to the determination condition, a condition that the difference between the electromagnetic wave prediction time and the image prediction time is equal to or less than the predetermined threshold; and enlarge the predetermined threshold based on whether or not a portion of the object is outside the imaging region of the image sensor.

9. The vehicle control apparatus according to claim 2, further comprising
wherein the set of computer-executable instructions further cause the processor to:
calculate a reliability of the same determination of the object, which is based on the first position and the second position,
change the determination condition in response to the reliability being equal to or greater than a predetermined value.

10. The vehicle control apparatus according to claim 1, wherein
the set of computer-executable instructions further cause the processor to:
calculate an electromagnetic wave search region and an image search region, and set, to the determination condition, a condition that there is a region which overlaps on both the calculated electromagnetic wave search region and the calculated image search region, the electromagnetic wave search region being a predetermined range i) defined based on, as a reference, the first position and ii) extending in both a direction along a distance from the own vehicle to the object and an azimuth direction from the own vehicle to the object, the image search region being a predetermined range defined based on, as a reference, the second position extending in the direction along the distance and the azimuth direction; and
enlarge the image search region in the direction along the distance based on whether or not a portion of the object is outside the imaging region of the image sensor.

11. The vehicle control apparatus according to claim 10, wherein
the set of computer-executable instructions further cause the processor to:
calculate i) based on a first position, an electromagnetic wave prediction time which is a predicted time until the object collides with the own vehicle and ii) based on the second position, an image prediction time which is a predicted time until the object collides with the own vehicle; and set, to the determination condition, a condition that the difference between the electromagnetic wave prediction time and the image prediction time is equal to or less than the predetermined threshold; and
enlarge the predetermined threshold based on whether or not a portion of the object is outside the imaging region of the image sensor.

12. The vehicle control apparatus according to claim 10, wherein the set of computer-executable instructions further cause the processor to:
calculate a reliability of the same determination of the object, which is based on the first position and the second position; and
change the determination condition in response to the reliability being equal to or greater than a predetermined value.

13. The vehicle control apparatus according to claim 1, wherein
the set of computer-executable instructions further cause the processor to:
calculate i) based on a first position, an electromagnetic wave prediction time which is a predicted time until the object collides with the own vehicle and ii) based on the second position, an image prediction time which is a predicted time until the object collides with the own vehicle; and set, to the determination condition, a condition that the difference between the electromagnetic wave prediction time and the image prediction time is equal to or less than the predetermined threshold; and
enlarge the predetermined threshold based on whether or not a portion of the object is outside the imaging region of the image sensor.

14. The vehicle control apparatus according to claim 1, wherein the set of computer-executable instructions further cause the processor to:
calculate a reliability of the same determination of the object, which is based on the first position and the second position; and
change the determination condition in response to the reliability being equal to or greater than a predetermined value.

15. A vehicle control method comprising:
determining whether or not an object at a first position and an object at a second position represent a same object based on the first position at which the object which exists in front of an own vehicle is detected by an electromagnetic wave sensor and the second position of the object detected from an image of a forward view of the own vehicle by an image sensor;
determining whether or not a portion of the object is outside of an imaging region of the image sensor, in which the object has been detected from the acquired image; and
changing a determination condition for determining whether or not the object represents the same object based on whether or not a portion of the object is outside the imaging region of the image sensor, wherein:
a value of a parameter indicative of a positional relation, between the first position at which the object exists detected by the electromagnetic wave sensor and the second position at which the object exists detected by the image sensor, is calculated; and
the vehicle control method further comprising:
determining whether the value of the parameter is less than a predetermined threshold, and determine that the object detected by the electromagnetic wave sensor and the object detected by the image sensor are the same object when it is determined that the value of the parameter is less than the predetermined threshold; and
increasing the predetermined threshold to be applied to a part of the object detected by the image sensor which is determined to be outside the imaging region of the image sensor, when it is determined that a part of the object detected by the image sensor is outside the imaging region of the image sensor.

16. A vehicle control apparatus comprising:
a processor;
a non-transitory computer-readable storage medium; and
a set of computer-executable instructions stored on the non-transitory computer-readable storage medium that cause the processor to:
determine whether or not an object at a first position and an object at a second position represent a same object based on the first position at which the object which exists in front of an own vehicle is detected by an electromagnetic wave sensor and the second position of the object detected from an image of a forward view of the own vehicle, the image being acquired by an image sensor;

determine whether or not a portion of the object is outside an imaging region of the image sensor, in which the object has been detected from the acquired image; and change a determination condition in determining whether or not the object represents the same object based on whether or not a portion of the object is outside the imaging region of the image sensor;

determine whether or not a lower part of the object is excluded from the acquired image;

determine an object caused an image loss, provided that the object is first subjected to determination of the same object, and the first position is then continuously detected and the second position is not detected; and determine whether to continue determining whether or not the object represents the same object in response to determining whether or not the lower part of the object is excluded from the acquired image and determining that the object caused the image loss, wherein:

a value of a parameter indicative of a positional relation, between the first position at which the object exists detected by the electromagnetic wave sensor and the second position at which the object exists detected by the image sensor, is calculated; and the set of computer-executable instructions further cause the processor to:

determine whether the value of the parameter is less than a predetermined threshold, and determine that the object detected by the electromagnetic wave sensor and the object detected by the image sensor are the same object when it is determined that the value of the parameter is less than the predetermined threshold; and increase the predetermined threshold to be applied to a part of the object detected by the image sensor which is determined to be outside the imaging region of the image sensor, when it is determined that a part of the object detected by the image sensor is outside the imaging region of the image sensor.

17. A vehicle control method performed by a vehicle control apparatus, the method comprising:

determining whether or not an object at a first position and an object at a second position represent a same object based on the first position at which the object which exists in front of an own vehicle is detected by an electromagnetic wave sensor and the second position of the object detected from an image of a forward view of the own vehicle, the image being acquired by an image sensor;

determining whether or not a portion of the object is outside an imaging region of the image sensor, in which the object has been detected from the acquired image; and changing a determination condition in determining whether or not the object represents the same object based on whether or not a portion of the object is outside the imaging region of the image sensor;

determining whether or not a lower part of the object is excluded from the acquired image;

determining an object caused an image loss, provided that the object is first subjected to determination of the same object, and the first position is then continuously detected and the second position is not detected; and determining whether to continue determining whether or not the object represents the same object in response to determining whether or not the lower part of the object is excluded from the acquired image and determining that the object caused the image loss, wherein:

a value of a parameter indicative of a positional relation, between the first position at which the object exists detected by the electromagnetic wave sensor and the second position at which the object exists detected by the image sensor, is calculated; and the vehicle control method further comprising:

determining whether the value of the parameter is less than a predetermined threshold, and determine that the object detected by the electromagnetic wave sensor and the object detected by the image sensor are the same object when it is determined that the value of the parameter is less than the predetermined threshold; and increasing the predetermined threshold to be applied to a part of the object detected by the image sensor which is determined to be outside the imaging region of the image sensor, when it is determined that a part of the object detected by the image sensor is outside the imaging region of the image sensor.

* * * * *